United States Patent
Kidokoro et al.

(10) Patent No.: US 9,958,044 B2
(45) Date of Patent: May 1, 2018

(54) POWER TRANSMISSION SWITCHING MECHANISM AND TRANSMISSION

(71) Applicant: HONDA MOTOR CO., LTD., Tokyo (JP)

(72) Inventors: Teruhisa Kidokoro, Wako (JP); Shuhei Kobayashi, Wako (JP); Satoshi Uchino, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 286 days.

(21) Appl. No.: 14/910,764

(22) PCT Filed: Jul. 30, 2014

(86) PCT No.: PCT/JP2014/070136
§ 371 (c)(1),
(2) Date: Feb. 8, 2016

(87) PCT Pub. No.: WO2015/019926
PCT Pub. Date: Feb. 12, 2015

(65) Prior Publication Data
US 2016/0186846 A1    Jun. 30, 2016

(30) Foreign Application Priority Data
Aug. 9, 2013   (JP) ................................ 2013-167119

(51) Int. Cl.
*F16H 37/06* (2006.01)
*F16H 37/02* (2006.01)

(52) U.S. Cl.
CPC ......... *F16H 37/021* (2013.01); *F16H 37/022* (2013.01); *F16H 2037/026* (2013.01)

(58) Field of Classification Search
CPC ............. F16H 37/021; F16H 2031/023; F16H 2031/025; F16H 2031/026
(Continued)

(56) References Cited

U.S. PATENT DOCUMENTS 4,665,773 A * 5/1987 Hiramatsu ............ B60W 10/02
477/39
4,901,597 A * 2/1990 Hattori .................. F16H 37/021
475/66
(Continued)

FOREIGN PATENT DOCUMENTS

JP         62-46063 A      2/1987
JP         63-115951 A     5/1988
(Continued)

OTHER PUBLICATIONS

International Search Report dated Nov. 4, 2014, issued in counterpart International Application No. PCT/JP2014/070136 (2 pages).

*Primary Examiner* — Ha Dinh Ho
(74) *Attorney, Agent, or Firm* — Westerman, Hattori, Daniels & Adrian, LLP

(57) ABSTRACT

Provided are a power transmission switching mechanism allowing reduction in size and weight in a simple configuration with a minimized piece-part count, and a transmission provided therewith. The power transmission switching mechanism includes a sleeve that moves in an axial direction of a rotation shaft, a hub section provided integrally with a gear for holding a sleeve axially slidably and unrotatably, and a dog spline installed to a pulley piston fixed to the rotation shaft for meshing the sleeve. In a state in which the sleeve is held to the hub section, the rotation shaft is disengaged with the gear and a relative rotation thereof is allowed. Meanwhile, when the sleeve axially moves from the hub section, the rotation shaft engages with the gear and both thereof rotate integrally.

1 Claim, 14 Drawing Sheets

(58) Field of Classification Search
USPC .................................. 74/330, 665 R, 665 GE
See application file for complete search history.

(56) References Cited

U.S. PATENT DOCUMENTS 4,986,396 A * 1/1991 Morimoto ............. B60W 10/06
   477/180
5,031,481 A    7/1991 Algrain et al.

FOREIGN PATENT DOCUMENTS

| JP | 3-48377 B2 | 7/1991 |
| JP | 3-181669 A | 8/1991 |
| JP | 7-293663 A | 11/1995 |

* cited by examiner

POWER TRANSMISSION SWITCHING MECHANISM AND TRANSMISSION

TECHNICAL FIELD

The present invention relates to a power transmission switching mechanism including a rotation shaft that rotates by a driving force from an input section, a gear disposed on the rotation shaft rotatably and an engagement switching mechanism for switching engagement and disengagement between the rotation shaft and the gear, and to a transmission including the power transmission switching mechanism.

BACKGROUND ART

As shown in patent documents 1 and 2, a conventional transmission is provided with a belt-type continuously variable transmission mechanism (CVT) including a primary pulley installed on a drive shaft, a secondary pulley installed on a driven shaft arranged parallel to the drive shaft at a predetermined distance and an endless V-belt wound between the primary pulley and the secondary pulley.

The transmission described in patent document 2 includes a power transmission switching mechanism (sub-transmission mechanism) for switching transmission routes of a driving force input to the continuously variable transmission mechanism (CVT) or a driving force output from the continuously variable transmission. This power transmission switching mechanism is structured by a jaw clutch, a synchromesh mechanism and other components, and provided with a hub fixed on the rotation shaft, a sleeve fit to the hub via a spline groove to slide axially and a gear for transmitting a driving force by engaging with the hub via the sleeve.

RELATED ART DOCUMENTS

Patent Documents

[Patent document 1] Examined Patent Publication (Kokoku) No. 3-48377
[Patent document 2] Japanese Unexamined Patent Application Publication No. 3-181669.

DISCLOSURE OF THE INVENTION

Problems to be Solved by the Invention

However, a large number of components of the conventional power transmission switching mechanism as described above causes problems such as structural complexity of the transmission and an increase in size and weight of the device. Moreover, the above-described power transmission switching mechanism is arranged next to a pulley shaft and a pulley piston of the continuously variable transmission mechanism. Due to this, a large number of components of the power transmission switching mechanism and incomplete assemblage thereof might prevent simplification of an assembling process of the transmission. In addition, a large number of components of the power transmission switching mechanism might cause degradation of accuracy of the power transmission switching mechanism and the transmission, due to cumulative dimensional tolerances.

The present invention was made in view of a point of the above-mentioned, and the purpose is to provide a power transmission switching mechanism allowing reduction in size and weight in a simple configuration with a minimized piece-part count, and also provide a transmission provided with such power transmission switching mechanism.

Means of Solving the Problems

In order to solve the above-described problems, a power transmission switching mechanism in accordance with the present invention includes an input section (20), a rotation shaft (14), a gear (29), output sections (33-35) and an engagement switching mechanism (30). To the input section (20), a driving force is input from a driving source (E). At least one of components (214) of the input section (20) is fixed to the rotation shaft (14) that rotates by a driving force transmitted from the component (214). The gear (29) is disposed rotatably on the rotation shaft (14). To the output sections (33-35), a driving force is output from the gear (29). The engagement switching mechanism (30) switches engagement and disengagement between the rotation shaft (14) and the gear (29). The engagement switching mechanism (30) includes a sleeve (305), a holding section (301) and a meshing section (310). The sleeve (305) moves in an axial direction of the rotation shaft (14). The holding section (301) is installed integrally with either one of the component (214) of the input section (20) or the gear (29). The holding section (301) holds the sleeve (305) axially slidably and unrotatably. The meshing section (310) is installed on another one of the component (214) of the input section (20) or the gear (29) and meshes with the sleeve (305). On one hand, in a state in which the sleeve (305) is held to the holding section (301), the rotation shaft (14) is disengaged with the gear (29), allowing a relative rotation thereof. On the other hand, when the sleeve (305) moves in the axial direction from the holding section (301) and accordingly meshes with the meshing section (310), the gear (29) and the rotation shaft (14) engage with each other and integrally rotate.

According to the power transmission switching mechanism in accordance with the present invention, the holding section holding the sleeve axially slidably and unrotatably is installed integrally with either one of the component of the input section or the gear, thereby allowing to reduce a number of components of the engagement switching mechanism. Therefore, this can achieve simplification of configuration and reduction in weight and assembling process of the engagement switching mechanism and the power transmission switching mechanism.

In other words, a conventional power transmission switching mechanism is provided with a hub, as one part installed on the rotation shaft, corresponding to the holding section for holding the sleeve. On the contrary, the power transmission switching mechanism in accordance with the present invention is provided with the holding section for holding the sleeve installed integrally with either one of the component of the input section or the gear, thereby allowing to omit any part corresponding to the conventional hub. Therefore, this can reduce the number of components of the engagement switching mechanism.

Further, according to the power transmission switching mechanism in accordance with the present invention, the holding section for holding the sleeve axially slidably and unrotatably is installed integrally with either one of the component of the input section or the gear. This can improve a degree of freedom in arranging and shaping the components of the engagement switching mechanism, and consequently optimize arrangement of the power transmission switching mechanism.

Further, in the above-described power transmission switching mechanism, the input section (20) includes a first pulley (21), a second pulley (22) and an endless member (23) wound between the first pulley (21) and the second pulley (22). The input section (20) is a transmission mechanism (20) for changing a rotation of a driving force from the driving source (E) into a predetermined gear ratio. The above-described rotation shaft (14) is at least one of the rotation shaft (14) of the first pulley (21) and a rotation shaft (15) of the second pulley (22). The first pulley (21) and the second pulley (22) include a fixed pulleys (21A, 22A) fixed on the rotation shafts (14, 15), and a movable pulleys (21B, 22B) axially movable with a pressure in a cylinder chambers (212, 222) formed by a pulley pistons (214, 224). Either one of the holding section (301) or the meshing section (310) of the engagement switching mechanism (30) may be installed integrally with the pulley piston (214, 224) or the fixed pulley (21A, 22A).

According to this configuration, either one of the holding section and the meshing section of the engagement switching mechanism is installed integrally with the pulley piston or the fixed pulley. This enables the transmission mechanism and the power transmission switching mechanism to share part of the components thereof with each other. Therefore, using the power transmission switching mechanism in accordance with the present invention as a power transmission switching mechanism for switching transmission and non-transmission of a driving force from the transmission mechanism of the above-described configuration can achieve reduction in number of the components of the transmission mechanism and the power transmission switching mechanism as well as simplification of the configuration thereof.

In addition, in the above-described power transmission switching mechanism, either one of the holding section (301) or the meshing section (310) of the engagement switching mechanism (30) is installed integrally with the pulley piston (214, 224). Such section as is installed integrally with the pulley piston (214, 224) includes a support member (146) supporting the gear (29) rotatably on the rotation shaft (14), and a bearing (145) holding the rotation shaft (14) rotatably. The same section may cause one end (146*a*) of the support member (146) to abut on the pulley piston (214) and another end (146*b*) to abut on the bearing (145).

According to this configuration, the one end of the support member for supporting the gear rotatably on the rotation shaft abuts on the pulley piston, and the other end abuts on the bearing. This allows the support member to have a function to position the pulley piston in the axial direction, making it unnecessary to provide a separate part for positioning of the pulley piston, and thus allows to achieve further reduction in parts of the transmission mechanism and the power transmission switching mechanism.

Furthermore, in the above-described engagement switching mechanism (30), the power transmission switching mechanism may include a synchronous engaging mechanism (320, 340). When the sleeve (305) moves to a meshing section (310) side from a holding section (301) side, the synchronous engaging mechanism meshes the sleeve (305) with the meshing section (310) while synchronizing a rotation of the gear (29) with a rotation of the rotation shaft (14).

According to this configuration, when the sleeve moves to the meshing section side from the holding section side to engage the rotation shaft with the gear, the engagement switching mechanism including the synchronous engaging mechanism can engage the sleeve with the meshing section while synchronizing the rotation of the gear and the rotation of the rotation shaft. Therefore, this can improve controllability of engagement between the gear and the rotation shaft using the engagement switching mechanism.

In addition, the transmission in accordance with the present invention includes an input shaft (13) to which a driving force is input from the driving source (E), the first pulley (21) and the second pulley (22) and the endless member (23) wound between the first pulley (21) and the second pulley (22). The transmission further includes the transmission mechanism (20), an output section (33-35), a first input route, a second input route, a first input switching mechanism (24A), a second input switching mechanism (24B), a first output route, a second output route, a deceleration mechanism (25, 26), an acceleration mechanism (27, 28), a first output switching mechanism (30) and a second output switching mechanism (32). The transmission mechanism (20) changes a rotation of a driving force from the input shaft (13) into a predetermined gear ratio. From the output section (33-35), a driving force from the transmission mechanism (20) is output. The first input route transmits a driving force from the input shaft (13) to the first pulley (21). The second input route transmits a driving force from the input shaft (13) to the second pulley (22). The first input switching mechanism (24A) is arranged between the first input route and the input shaft (13) to switch a driving force from the input shaft (3) to an input to the first pulley (21). The second input switching mechanism (24B) is arranged between the second input route and the input shaft (13) to switch a driving force from the input shaft (13) to an input to the second pulley (22). The first output route outputs a rotation of a driving force speed-changed in the transmission mechanism (20) from the first pulley (21) to the output section (33-35). The second output route outputs a rotation of a driving force speed-changed in the transmission mechanism (20) from the second pulley (22) to the output section (33-35). The deceleration mechanism (25, 26) is installed in the first output route to decelerate a rotation of a driving force input to the transmission mechanism (20) from the input shaft (13). The acceleration mechanism (27, 28) is installed in the second input route to accelerate a rotation of a driving force input to the transmission mechanism (20) from the input shaft (13). The first output switching mechanism (30) is installed in the first output route to switch a driving force from the first output route to an output to the output section (33-35). The second output switching mechanism (32) is installed in the second output route to switch a driving force from the second output route to an output to the output section (33-35). As at least one of the first input switching mechanism (24A), the second input switching mechanism (24B), the first output switching mechanism (32) and the second output switching mechanism (30), the transmission includes the power transmission switching mechanism of the above-described configuration in accordance with the present invention.

As at least one of the above-described first input switching mechanism, the second input switching mechanism, the first output switch and the second output switching mechanism, the transmission in accordance with the present invention includes the power transmission switching mechanism of the above-described configuration in accordance with the present invention. This can reduce a number of components of such one of the first input switching mechanism, the second input switching mechanism, the first output switching mechanism and the second output switching mechanism, to which the power transmission switching mechanism in accordance with the present invention is applied. Therefore, this can achieve simplification of configuration and reduction in weight and assembling process of the transmission. It should be noted that the bracketed reference numerals are examples of the elements of the embodiment described later.

Effects of the Invention

The power transmission switching mechanism and the transmission provided therewith of the present invention can achieve reduction in size and weight in a simple configuration with a small number of components.

MODE FOR CARRYING OUT THE INVENTION

Figure 1:
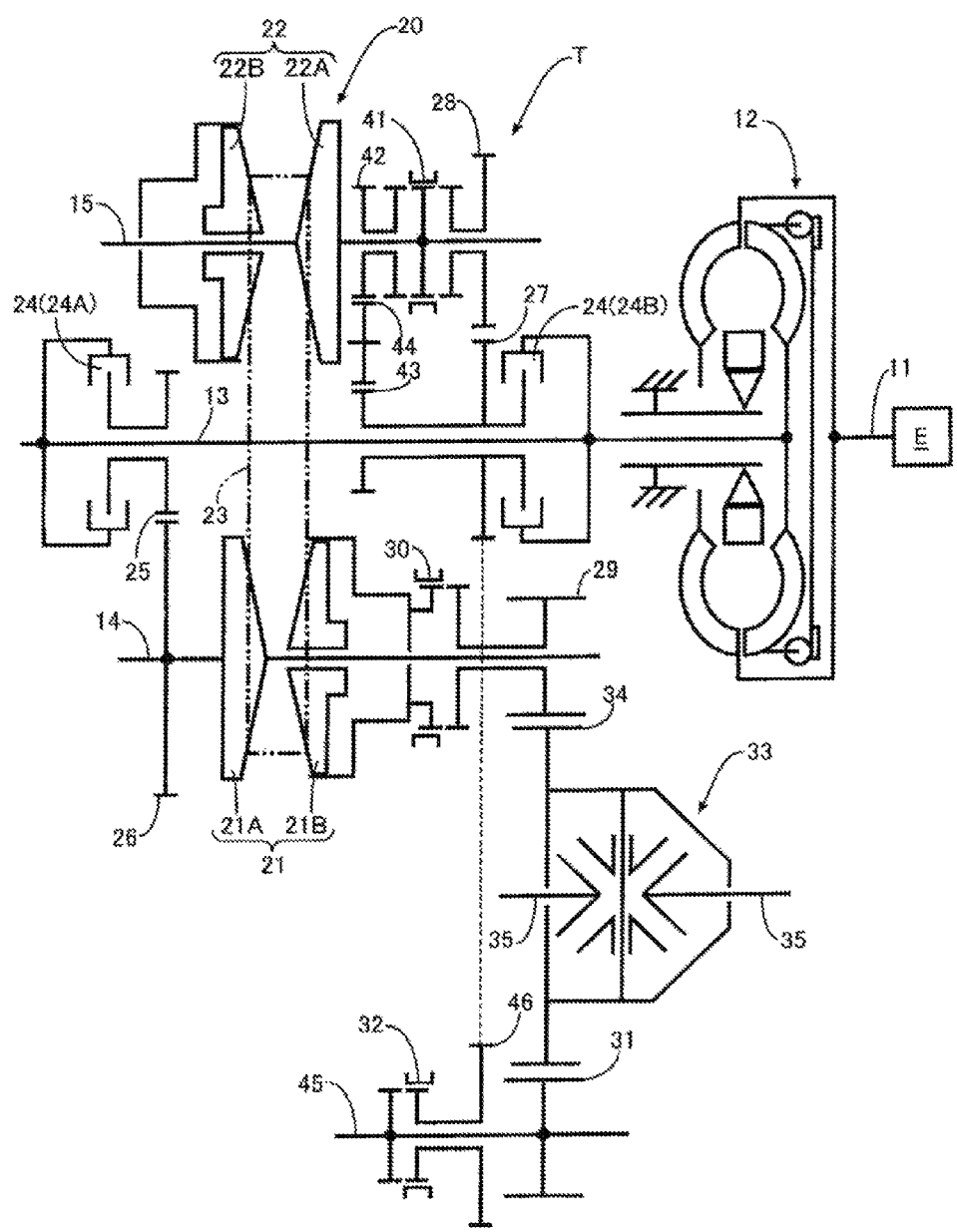
FIG. 1 is a skeleton view illustrating a whole configuration of a continuously variable transmission of one embodiment of the present invention.

Embodiments of the present invention will now be described in detail with reference to the accompanying drawings. FIG. 1 is a skeleton view illustrating a whole configuration of a belt-type continuously variable transmission mechanism (CVT) of a first embodiment of the present invention. As shown in the figure, the continuously variable transmission T mounted on a vehicle includes a main input shaft 13 connected to a crankshaft 11 of an engine E via a torque converter 12, and a first sub-input shaft 14 and a second sub-input shaft 15 arranged parallel to the main input shaft 13. On the main input shaft 13, an input switching mechanism 24 structured by a LOW friction clutch (first input switching mechanism) 24A and an HI friction clutch (second input switching mechanism) 24B is arranged.

On the second sub-input shaft 15, a forward-reverse switching mechanism 41 structured by a dog clutch is installed. When a sleeve of the forward-reverse switching mechanism 41 moves rightward, a second induction gear 28 is coupled to the second sub-input shaft 15. And, when the sleeve of the forward-reverse switching mechanism 41 moves leftward, a reverse drive gear 42 is coupled to the second sub-input shaft 15. The reverse drive gear 42 is connected via a reverse idle gear 44 to a reverse driven gear 43 installed integrally with a first induction gear 27.

A belt-type continuously variable transmission mechanism (input section) 20 arranged between the first sub-input shaft 14 and the second sub-input shaft 15 includes a first pulley 21 installed on the first sub-input shaft 14, a second pulley 22 installed on the second sub-input shaft 15 and an endless belt (endless member) 23 wound around the first and second pulleys 21, 22. A groove of the first and second pulleys 21, 22 increase and decrease in groove width in mutually opposite directions due to a hydraulic pressure, thereby allowing to continuously change a gear ratio between the first sub-input shaft 14 and the second sub-input shaft 15. The first pulley 21 is structured by a first fixed pulley 21A fixed to the first sub-input shaft 14 and a first movable pulley 21B approachable to and separable from the first fixed pulley 21A. The second pulley 22 is structured by a second fixed pulley 22A fixed to the second sub-input shaft 15 and a second movable pulley 22B approachable to and separable from the second fixed pulley 22A.

To the first sub-input shaft 14, a second reduction gear 26 meshing with a first reduction gear 25 on the main input shaft 13 is fixedly-installed. And, to the second sub-input shaft 15, a second induction gear 28 meshing with the first induction gear 27 on the main input shaft 13 is supported rotatably.

On one hand, the first and second reduction gears 25, 26 decelerate a rotation of the main input shaft 13 and then the decelerated rotation is transmitted to the first sub-input shaft 14. On the other hand, the first and second induction gears 27, 28 accelerate a rotation of the main input shaft 13 and then the accelerated rotation is transmitted to the second sub-input shaft 15. Therefore, the first reduction gear 25 and the second reduction gear 26 constitute a deceleration mechanism for decelerating a rotation of a driving force input from the main input shaft 13 to the belt-type continuously variable transmission mechanism 20. Also, the first induction gear 27 and the second induction gear 28 constitute an acceleration mechanism for accelerating a rotation of a driving force input from the main input shaft 13 to the belt-type continuously variable transmission mechanism 20.

To the first sub-input shaft 14, a second final drive gear 29 is supported rotatably. And, this second final drive gear 29 is connectable to the first sub-input shaft 14 using a second output switching mechanism (engagement switching mechanism) 30. In addition, to a third output shaft 45, a third reduction gear 46 meshing with the first induction gear 27 is supported rotatably. And, the third reduction gear 46 is connectable to the third output shaft 45 via a first output switching mechanism 32. To the third output shaft 45, a first final drive gear 31 is fixedly-installed. The first and second final drive gears 31, 29 mesh with a final driven gear 34 of a differential gear 33. And, right and left driving wheels are connected to drive shafts 35, 35 extending from the differential gear 33 to right and left.

Figure 2:
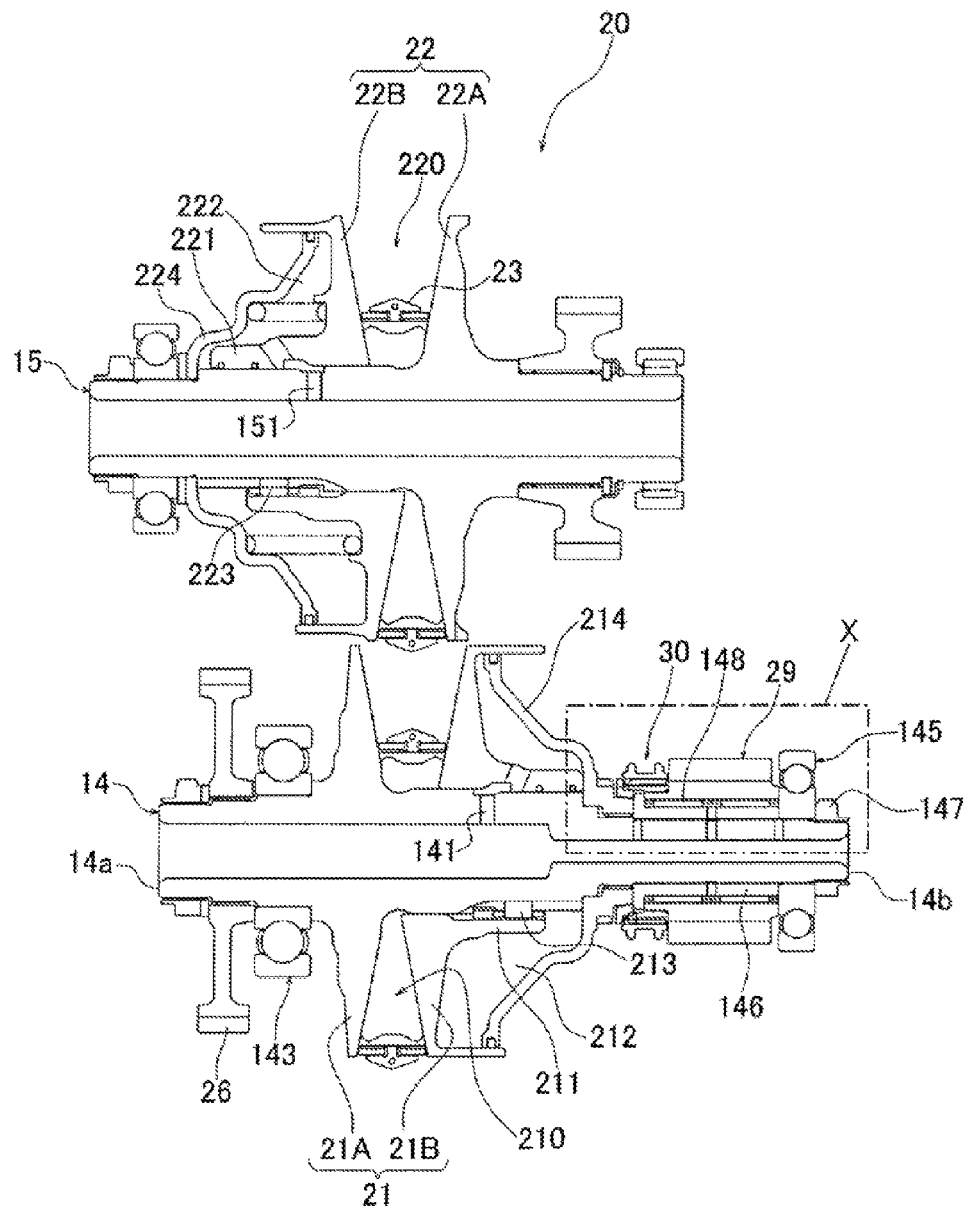
FIG. 2 is a side sectional view illustrating a belt-type continuously variable transmission mechanism provided in a continuously variable transmission.

Next, the belt-type continuously variable transmission mechanism 20 will be described below. FIG. 2 is a side sectional view illustrating the belt-type continuously variable transmission mechanism. As above described, the belt-type continuously variable transmission mechanism 20 includes the first pulley 21 installed on the first sub-input shaft 14, the second pulley 22 installed on the second sub-input shaft 15 and the endless V-belt (endless belt) 23 wound between the first pulley 21 and the second pulley 22.

The first pulley 21 is structured by the fixed pulley 21A and the movable pulley 21B. Between the fixed pulley 21A and the movable pulley 21B, a gripping groove 210 for gripping the endless belt 23 is formed. The fixed pulley 21A is installed integrally with the first sub-input shaft 14. The movable pulley 21B has a pipe-shaped flange section 211 extending along an axial direction to an opposite side of the fixed pulley 21A. The flange section 211 is spline-fit (roller spline-fit) to the first sub-input shaft 14 via a roller member (roller spline) 213. Thus, the movable pulley 21B is provided relatively unrotatably and axially movably on the first sub-input shaft 14.

On a back side of the movable pulley 21B (on the opposite side of the fixed pulley 21A), a cylinder chamber 212 surrounded by a pulley piston (pulley cover) 214 is formed. To the cylinder chamber 212, a hydraulic pressure controlled by a hydraulic pressure control means is supplied. The hydraulic pressure control means includes an oil pump for supplying hydraulic fluid to an oil passage 141 of the first sub-input shaft 14, a pressure regulating valve and other parts, which are not shown in the figure. The regulated hydraulic pressure supplied to the cylinder chamber 212 generates a lateral pressure (pulley lateral pressure) for moving the movable pulley 21B in the axial direction.

The second pulley 22 is structured by the fixed pulley 22A and the movable pulley 22B. Between the fixed pulley 22A and the movable pulley 22B, a gripping groove 220 for gripping the endless belt 23 is formed. On one hand, the fixed pulley 22A is fixed integrally with the second sub-input shaft 15. On the other hand, the movable pulley 22B has a pipe-shaped flange part 221 extending along the axial direction to an opposite side of the fixed pulley 22A. The flange part 221 is spline-fit to the second sub-input shaft 15 via a roller member 223. Thus, the movable pulley 22B is installed relatively unrotatably and movably in the axial direction on the second sub-input shaft 15. On a back side of the movable pulley 22B (on the opposite side of the fixed pulley 22A), a cylinder chamber 222 surrounded by a pulley piston (pulley cover) 224 is formed. To the cylinder chamber 222, a hydraulic pressure from the above-described hydraulic pressure control means for supplying hydraulic fluid to the oil passage 151 of the second sub-input shaft 15 is supplied. The regulated hydraulic pressure supplied to the cylinder chamber 222 generates a lateral pressure (pulley lateral pressure) for moving the movable pulley 22B in the axial direction.

In a vicinity of one end (on a fixed pulley 21A side) 14a of the first sub-input shaft 14, a second reduction gear 26 is fastened by spline-fitting. In addition, between the second reduction gear 26 and the fixed pulley 21A on the first sub-input shaft 14, a bearing 143 is arranged for supporting the first sub-input shaft 14 rotatably. In a vicinity of another end (on a movable pulley 21B side) 14b of the first sub-input shaft 14, a bearing 145 is arranged for supporting the first sub-input shaft 14 rotatably. A shaft end nut (locking tool) 147 screwed to the end 14b of the first sub-input shaft 14 positions the bearing 145 and prevents the bearing 145 from falling out in the axial direction. Between the pulley piston 214 on the first sub-input shaft 14 and the bearing 145, the second final drive gear 29 is arranged. In addition, between the pulley piston 214 on the first sub-input shaft 14 and the second final drive gear 29, the second output switching mechanism (sub-transmission) 30 is arranged. The second output switching mechanism (sub-transmission mechanism) 30 is an engagement switching mechanism for switching engagement and disengagement between the first sub-input shaft 14 and the second final drive gear 29.

Figure 3:
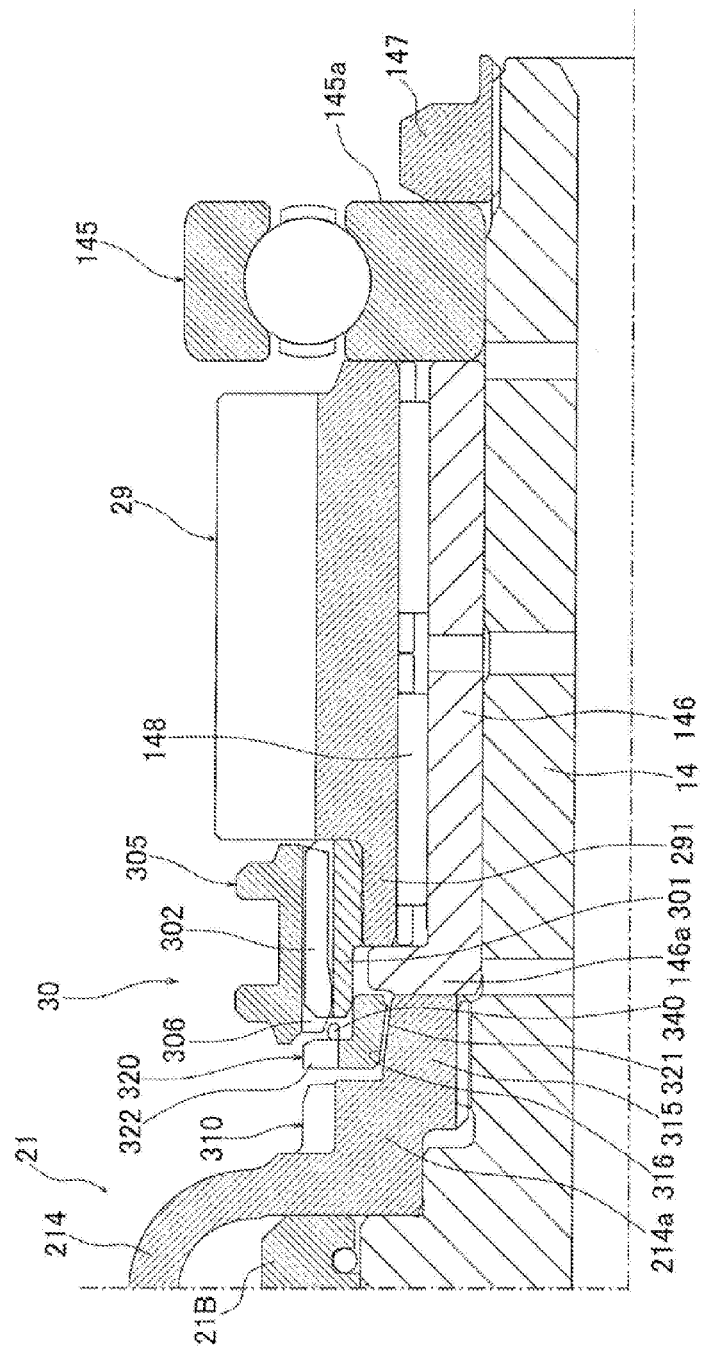
FIG. 3 is a view illustrating an output switching mechanism of a continuously variable transmission (an enlarged view of X part of FIG. 2)

FIG. 3 is a view illustrating a detailed configuration of the second final drive gear 29 and the second output switching mechanism 30 (an enlarged view of X part of FIG. 2). As shown in the figure, on an outer periphery of the first sub-input shaft 14, a substantially cylindrical support member 146 press-fit and fastened to the first sub-input shaft 14 is installed. The second final drive gear 29 is installed rotatably to an outer periphery of the support member 146 via a needle bearing 148. On the other hand, an end (on a second final drive gear 29 side) 214a of the pulley piston 214 is fastened to the outer periphery of the first sub-input shaft 14 by spline fitting. And, between the end 214a of the pulley piston 214 and the second final drive gear 29, the second output switching mechanism 30 is arranged for switching engagement and disengagement therebetween.

The second output switching mechanism 30 includes a synchronous hub section (holding section) 301, a synchronous sleeve 305 and a dog spline (meshing section) 310. The synchronous hub section (holding section) 301 is press-fit to and accordingly installed integrally with an outer periphery of a small-diameter end part 291 formed at an end of the second final drive gear 29 (on a first pulley 21 side). The synchronous sleeve 305 is arranged on an outer periphery of the synchronous hub section 301 relatively unrotatably and axially slidably. The dog spline (meshing section) 310 is formed on an outer periphery on a synchronous hub section 301 side of the end 214a of the pulley piston 214. A plurality of the dog splines 310 are equally spaced along a circumferential direction on an outer peripheral surface of the end 214a of the pulley piston 214.

On an outer peripheral surface of the synchronous hub section 301, a spline tooth 302 is formed. On an inner peripheral surface of the synchronous sleeve 305, a spline tooth 306 meshing with the spline tooth 302 of the synchronous hub section 301 and a dog spline 310 of the pulley piston 214 is formed. A plurality of the spline teeth 302 are equally spaced along the circumferential direction on an outer peripheral surface of the synchronous hub section 301. A plurality of the spline teeth 306 are equally spaced along the circumferential direction on an inner peripheral surface of the synchronous hub section 305.

In a state, as shown in FIG. 3, in which the synchronous sleeve 305 is at a disengagement position on the synchronous hub section 301, the pulley piston 214 and the first sub-input shaft 14 are disengaged with the second final drive gear 29, enabling a relative rotation of the first sub-input shaft 14 and the second final drive gear 29 is enabled. When a sliding of a shift fork, not shown in the figure, moves the synchronous sleeve 305 along the axial direction from the disengagement position on the synchronous hub section 301 shown in FIG. 3 to a pulley piston 214 side (leftward in the figure), the spline tooth 306 of the synchronous sleeve 305 engages (meshes) with both of the spline tooth 302 of the synchronous hub section 301 and the dog spline 310 of the pulley piston 214. Due to this, the pulley piston 214 and the first sub-input shaft 14 are engaged with the second final drive gear 29, whereby the first sub-input shaft 14 and the second final drive gear 29 can rotate integrally.

Further, at a tip of the end 214a of the pulley piston 214, a pipe-shaped boss section 315 is formed adjacent to the dog spline 310 and extends to a second final drive gear 29 side. On an outer periphery of the boss section 315, a tapered cone surface 316 structured by a surface conically inclined in the axial direction is formed. To an outer diameter side of the tapered cone surface 316, a blocking ring (synchronizer ring) 320 is fit. The blocking ring 320 is a circular ring member having a predetermined width. On an inner peripheral surface of the blocking ring 320, a tapered cone surface 321 structured by a conically inclined surface in sliding contact with the tapered cone surface 316 of the boss section 315 is formed. Furthermore, the blocking ring 320 is provided with a plurality of engaging sections structured by small protrusions formed at a plurality of places (three places for instance) equally spaced on an outer peripheral surface of the blocking ring 320, although not shown in the figure. The engaging sections engage with concave receiving sections (not shown in the figure) disposed on the synchronous hub section 301, with small gaps therebetween in the circumferential direction. This allows the blocking ring 320 to rotate relatively to the synchronous hub 301 and the synchronous sleeve 305 by a half pitch of a dog tooth 322, which will be described later.

A plurality of the dog teeth 322 projecting outward in a diameter direction are formed on an outer peripheral surface of the blocking ring 320. The plurality of the dog teeth 322 are equally spaced along the circumferential direction on the outer peripheral surface of the blocking ring 320.

An annular synchronous spring 340 is arranged on an outer periphery of the blocking ring 320. The synchronous spring 340 is a member of elastic metal wire rod formed into an annular ring shape. On the outer periphery of the blocking ring 320, the synchronous spring 340 is installed adjacent to the dog tooth 322 on a synchronous hub section 301 side and a synchronous sleeve 305 side in the axial direction. When the synchronous sleeve 305 is at the disengagement position, this synchronous spring 340 is at a position surrounded by the dog tooth 322 of the blocking ring 320, an end surface of the synchronous hub 302 in the axial direction and a tip (an end on a pulley piston 214 side) of the spline tooth 306 of the synchronous sleeve 305. When the synchronous sleeve 305 slides to the a pulley piston 214 side, the synchronous spring 340 is pressed by a bottom end of the tip of the spline tooth 306 and consequently pushed out to a shaft center side (to a left obliquely downward side in the figure) toward a dog tooth 322 side. The blocking ring 320 and the synchronous spring 340 as described above, the boss section 315 and other component sections constitute a synchronous engaging mechanism. When the synchronous sleeve 305 moves to a dog spline 310 side from the synchronous hub section 301 side, this synchronous engaging mechanism engages the synchronous sleeve 305 with the dog spline 310, while synchronizing a rotation of the second final drive gear 29 with a rotation of the pulley piston 214.

Next, a synchronous engaging operation using the second output switching mechanism 30 provided with the synchronous engaging mechanism of the above-described configuration will be described below. If a shift operation of a shift lever (not shown in the figure) moves (slides) the synchronous sleeve 305 to a pulley piston 214 side, the spline tooth 306 of the synchronous sleeve 305 presses the synchronous spring 340 inward in the diameter direction and axially to a pulley piston 214 side. This presses the blocking ring 320 to the dog spline 310 side via the synchronous spring 340.

When the synchronous sleeve 305 moves farther to the pulley piston 214 side, the tapered cone surface 321 of the blocking ring 320 and the tapered cone surface 316 of the boss section 315 abut on each other. Subsequently, friction torque occurs therebetween, whereby the dog spline 310 begins to synchronously rotate. When the synchronous sleeve 305 moves farther, the friction torque generated between the tapered cone surface 321 of the blocking ring 320 and the tapered cone surface 316 of the boss section 315 is lost to end a synchronous operation between the blocking ring 320 and the dog spline 310.

When the synchronous sleeve 305 moves more following such synchronization between the synchronous sleeve 305 and the dog spline 310 as described above, the spline tooth 306 of the synchronous sleeve 305 comes into contact with the dog spline 310. When the synchronous sleeve 305 moves farther, the spline tooth 306 of the synchronous sleeve 305 engages with the dog spline 310. This completes an engagement between the synchronous sleeve 305 and the pulley piston 214.

In the second output switching mechanism 30 of the present embodiment, the synchronous hub section (holding section) 305 holding the synchronous sleeve 305 axially slidably and unrotatably is installed integrally with the second final drive gear 29. This can reduce a number of components of the second output switching mechanism 30. Therefore, this can achieve simplification of configuration and reduction in weight and assembling process of the second output switching mechanism 30 and the belt-type continuously variable transmission mechanism 20.

In other words, since a conventional synchronous hub for holding the synchronous sleeve is installed as one component part attached on the rotation shaft, the output switching mechanism (sub-transmission) has a large number of component parts, resulting in complexity of structure and complicatedness of assembling process. In contrast, in the second output switching mechanism (sub-transmission mechanism) 30 provided in the belt-type continuously variable transmission 20 of the present embodiment, as described above, the synchronous hub section for holding the synchronous sleeve 305 is installed integrally with the second final drive gear 29. This can omit a component part corresponding to the conventional synchronous hub, ensuring a reduced number of component parts of the second output switching mechanism 30 and the continuously variable transmission T.

In addition, the second output switching mechanism 30 is arranged adjacent to the movable pulley 21B (pulley piston 214) of the first pulley 21. In the second output switch mechanism 30, one end 146a of the support member 146 supporting the second final drive gear 29 rotatably on the first sub input shaft 14 abuts on the end 214a of the pulley piston 214, and another end 146b thereof abuts to an inner race 145a of the bearing 145.

According to this configuration, the one end of the support member 146 abuts on the pulley piston 214, and the other end abuts on the bearing, thereby allowing the support member 146 supporting the second final drive gear 29 rotatably on the first sub-input shaft 14 to have a function to position the pulley piston 214 in the axial direction. Therefore, without any need to separately provide a component part for positioning the pulley piston 214 in the axial direction, this configuration can achieve further reduction in number of component parts of the belt-type continuously variable transmission mechanism 20 and the second output switching mechanism 30.

Figure 4:
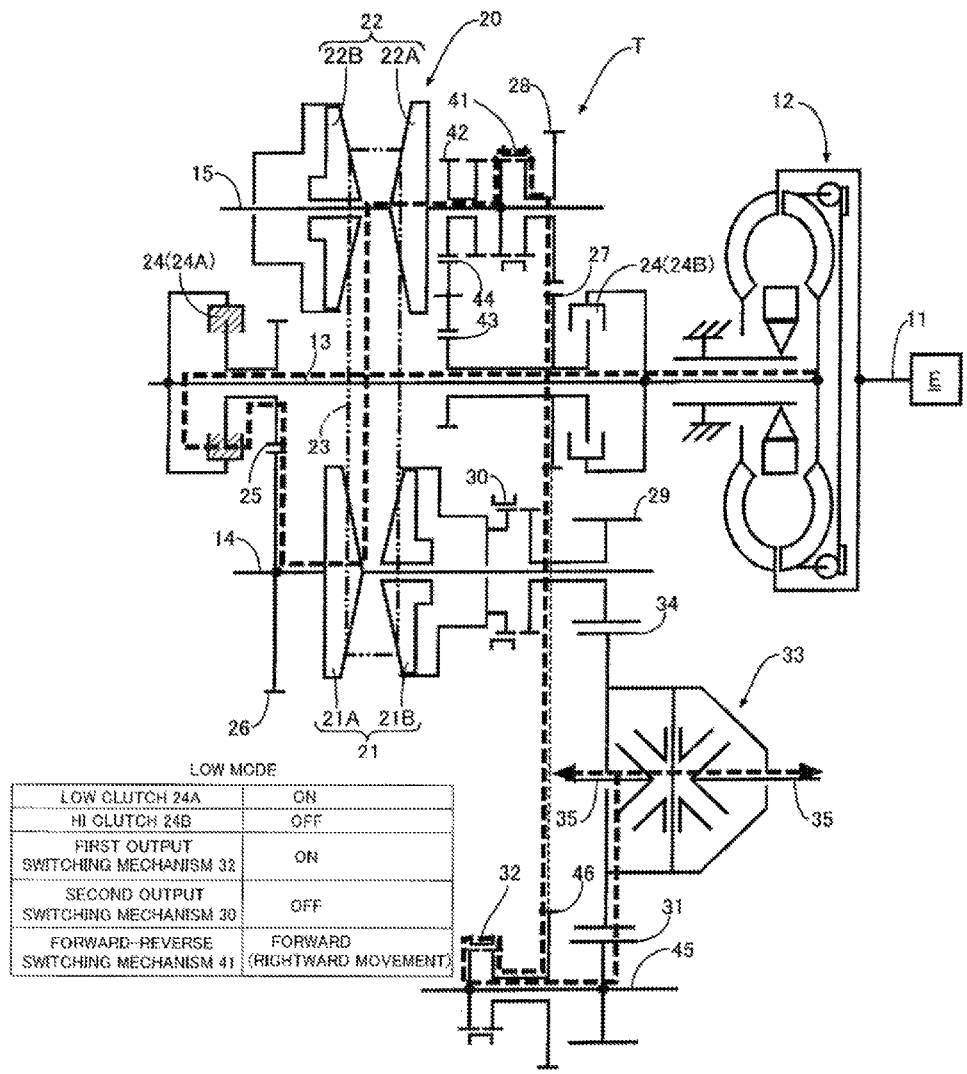
FIG. 4 is a torque flow in LOW mode.

Next, each shifting mode of the continuously variable transmission T shown in FIG. 1 and a power transmission route thereof will be described below. FIG. 4 illustrates a LOW mode of the continuously variable transmission T. In the LOW mode, a LOW friction clutch 24A of the input switching mechanism 24 engages, the first output switching mechanism 32 engages, the second output switching mechanism 30 disengages, and accordingly the forward-reverse switching mechanism 41 switches to a forward side (rightward movement).

Consequently, a driving force of the engine E is transmitted to the driving wheels via a route of the crankshaft 11→torque converter 12→main input shaft 13→LOW friction clutch 24A of the input switching mechanism 24→first reduction gear 25→second reduction gear 26→first sub-input shaft 14→first pulley 21→endless belt 23→second pulley 22→second sub-input shaft 15→forward-reverse switching mechanism 41→second induction gear 28→first induction gear 27→third reduction gear 46→first output switching mechanism 32→third output shaft 45→first final drive gear 31→final driven gear 34→differential gear 33→drive shaft 35, 35.

In the LOW mode, the belt-type continuously variable transmission mechanism 20 transmits a driving force from a first sub-input shaft 14 side to a second sub-input shaft 15 side. Depending on a change of gear ratio of the driving force, an overall gear ratio of the belt-type continuously variable transmission mechanism 20 changes.

In the present embodiment, as shown in FIG. 4, in the LOW mode, the first and second induction gears 27, 28 transmit torque from a second induction gear 28 side to a first induction gear 27 side. Therefore, a use of the first and second induction gears 27, 28, which are originally accelerators, as speed reducers can increase a gear ratio of a LOW side of the overall gear ratio. Further, a power transmission route of the above-described LOW friction clutch 24A→first reduction gear 25→second reduction gear 26→first sub-input shaft 14→first pulley 21, corresponds to a first input route in accordance with the present invention. Further, a power transmission route of the above-described second pulley 22→second sub-input shaft 15→forward-reverse switching mechanism 41→second induction gear 28→first induction gear 27→third reduction gear 46→first output switching mechanism 32→third output shaft 45→first final drive gear 31→final driven gear 34, corresponds to a second input route in accordance with the present invention.

Figure 5:
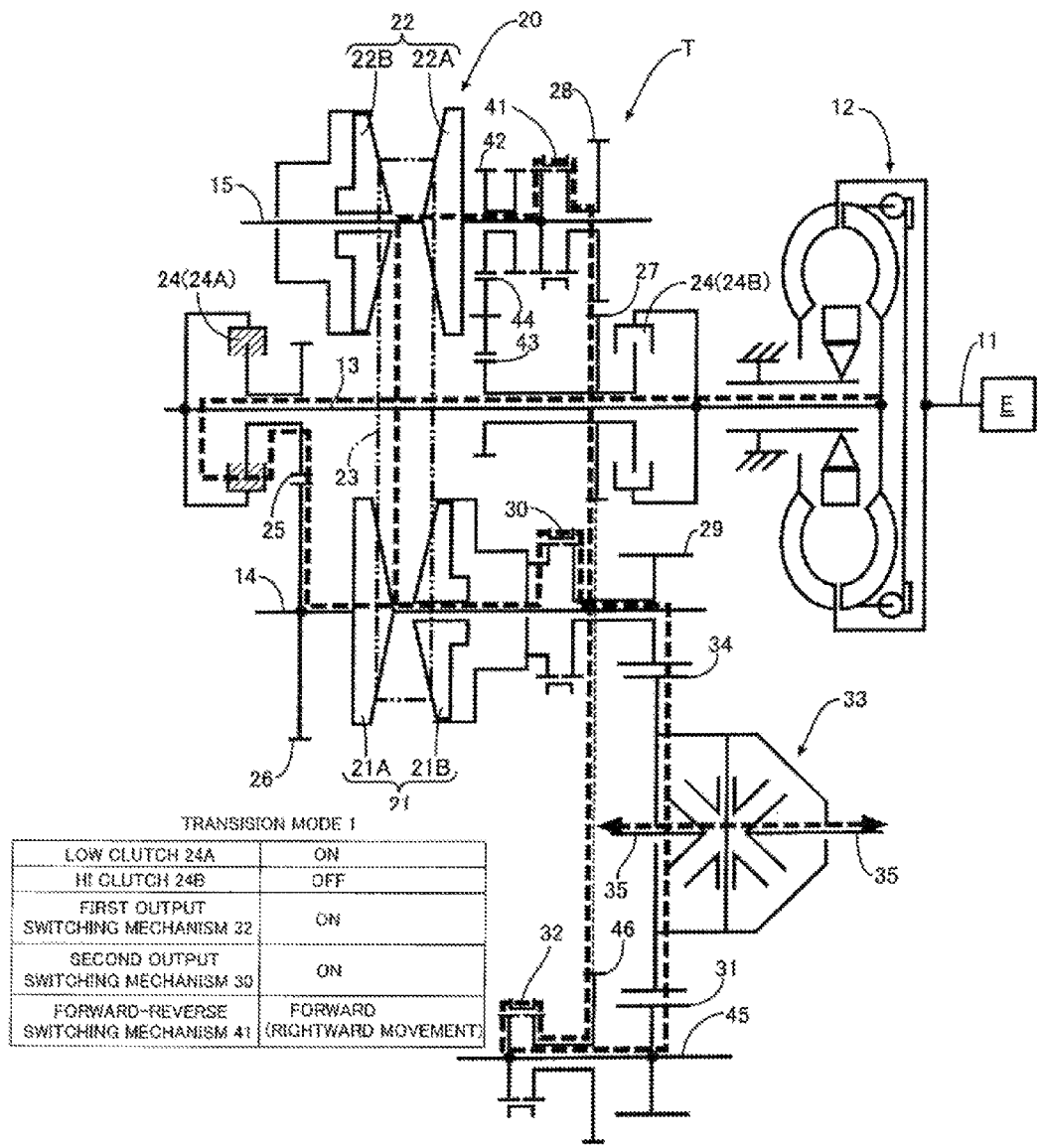
FIG. 5 is a torque flow in transition mode 1.

FIG. 5 illustrates a transition mode 1 (first half), in which the above-described LOW mode shifts to a later-described HI mode. In the transition mode 1, the LOW friction clutch 24A of the input switching mechanism 24 engages, the first output switching mechanism 32 engages, the second output switching mechanism 30 engages, the forward-reverse switching mechanism 41 switches to the forward side (rightward movement), and accordingly the above-described LOW mode and a later-described direct connection LOW mode (refer to FIG. 9) are established simultaneously.

Figure 6:
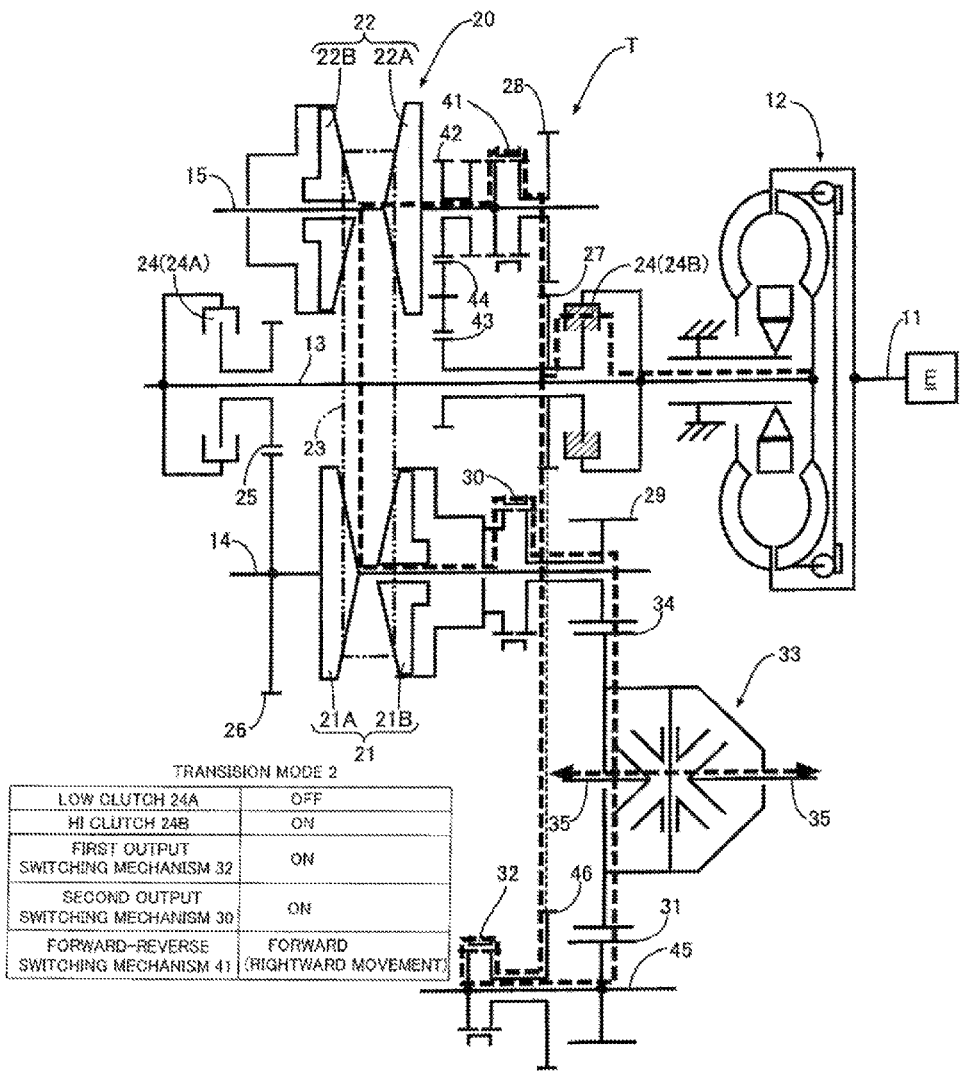
FIG. 6 is a torque flow in transition mode 2.

FIG. 6 illustrates a latter half of transition mode 2, in which the above-described LOW mode shifts to the later-described HI mode. In the transition mode 2, the HI friction clutch 24B of the input switching mechanism 24 engages, the first output switching mechanism 32 engages, the second output switching mechanism 30 engages, the forward-reverse switching mechanism 41 switches to the forward side (rightward movement), and accordingly the later-described HI mode (refer to FIG. 7) and a later-described direct relation HI mode (refer to FIG. 10) are established simultaneously. It should be noted that the transition mode 1 and the transition mode 2 are intended to smoothly perform a transition from the LOW mode to the HI mode.

Figure 7:
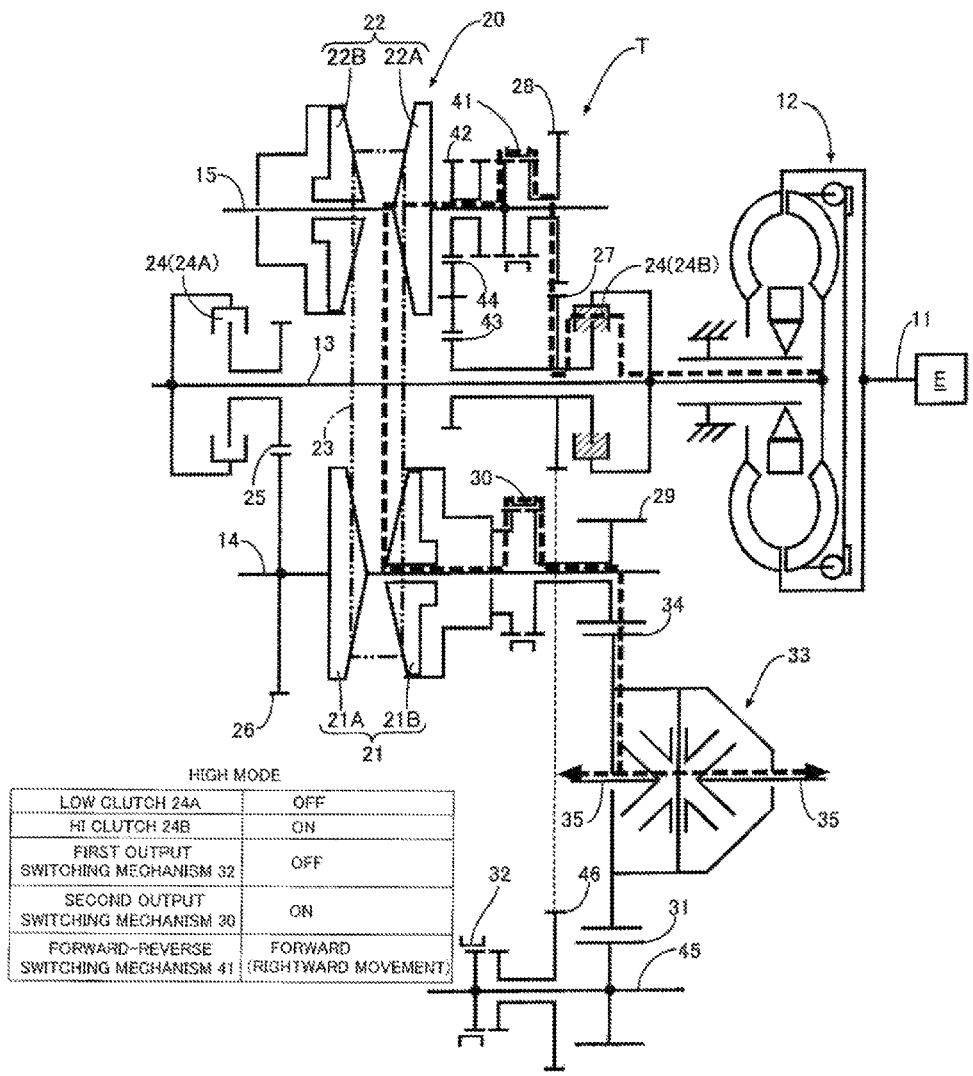
FIG. 7 is a torque flow in HI mode.

FIG. 7 illustrates the HI mode of the continuously variable transmission T. In the HI mode, the HI friction clutch 24B of the input switching mechanism 24 engages, the first output switching mechanism 32 disengages, the second output switching mechanism 30 engages, the forward-reverse switching mechanism 41 switches to the forward side (rightward motion).

Consequently, a driving force of the engine E is transmitted via a route of the crankshaft 11→torque converter 12→main input shaft 13→HI friction clutch 24B of the input switching mechanism 24→first induction gear 27→second induction gear 28→forward-reverse switching mechanism 41→second sub-input shaft 15→second pulley 22→endless belt 23→first pulley 21→first sub-input shaft 14→second output switching mechanism 30→second final drive gear 29→final driven gear 34→differential gear 33→drive shafts 35, 35.

In the HI mode, the belt-type continuously variable transmission mechanism 20 transmits a driving force from the second sub-input shaft 15 side to the first sub-input shaft 14 side. An overall gear ratio of the belt-type continuously variable transmission mechanism 20 changes depending on a change of gear ratio of the driving force.

The above-described route of the HI friction clutch 24B→first induction gear 27→second induction gear 28→forward-reverse switching mechanism 41→second sub-input shaft 15→second pulley 22, corresponds to a second input route in accordance with the present invention. The above-described route of the first pulley 21→first sub-input shaft 14→second output switching mechanism 30→second final drive gear 29→final driven gear 34, corresponds to a first input route in accordance with the present invention.

Figure 8:
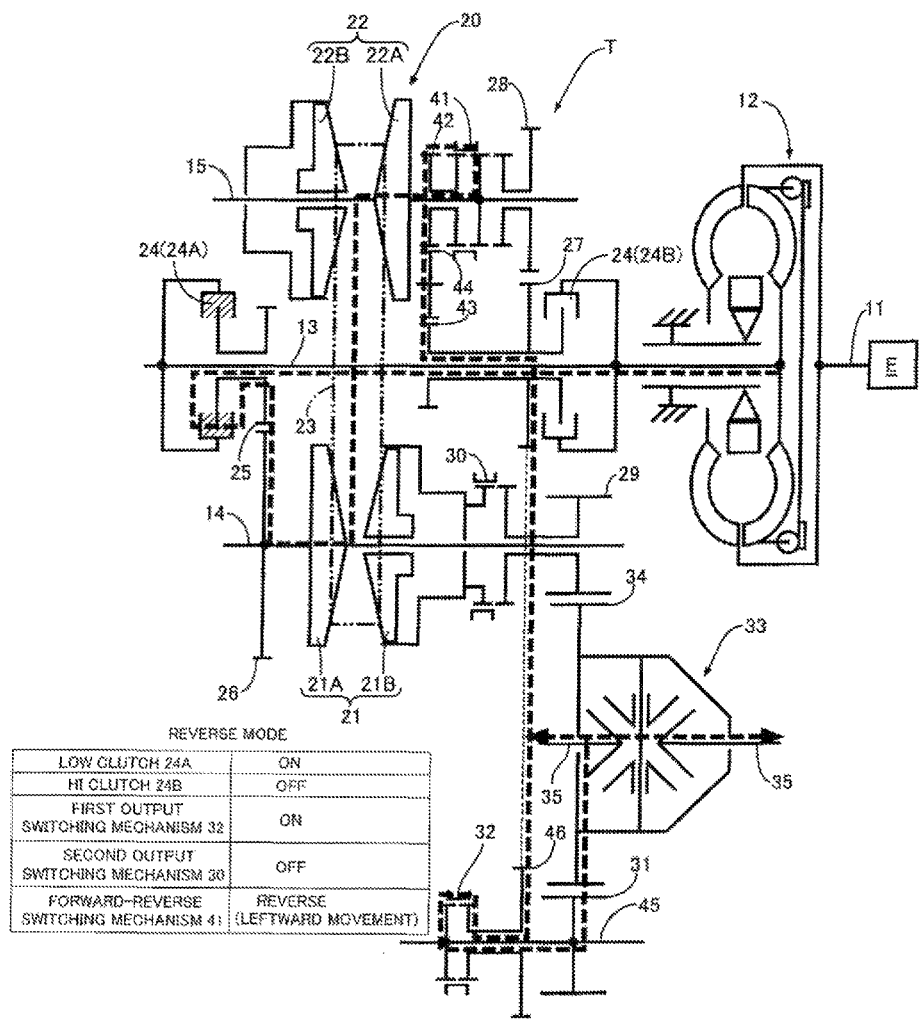
FIG. 8 is a torque flow in reverse mode.

FIG. 8 illustrates a reverse mode of the belt-type continuously variable transmission mechanism 20. In the reverse mode, the LOW friction clutch 24A of the input switching mechanism 24 engages, the first output switching mechanism 32 engages, the second output switching mechanism 30 disengages, and the forward-reverse switching mechanism 41 switches to a reverse side (leftward movement).

Consequently, a driving force of the engine E is transmitted via a route of the crankshaft 11→torque converter 12→main input shaft 13→LOW friction clutch 24A of the input switching mechanism 24→first reduction gear 25→second reduction gear 26→first sub-input shaft 14→first pulley 21→endless belt 23→second pulley 22→second sub-input shaft 15→forward-reverse switching mechanism 41→reverse drive gear 42→reverse idle gear 44→reverse driven gear 43→first induction gear 27→third reduction gear 46→first output switching mechanism 32→third output shaft 45→first final drive gear 31→final driven gear 34→differential gear 33→drive shafts 35, 35.

In the reverse mode, the belt-type continuously variable transmission mechanism 20 transmits a driving force from the first sub-input shaft 14 side to the second sub-input shaft 15 side. An overall gear ratio of belt-type continuously variable transmission mechanism 20 changes depending on a change of a gear ratio of the driving force.

Figure 9:
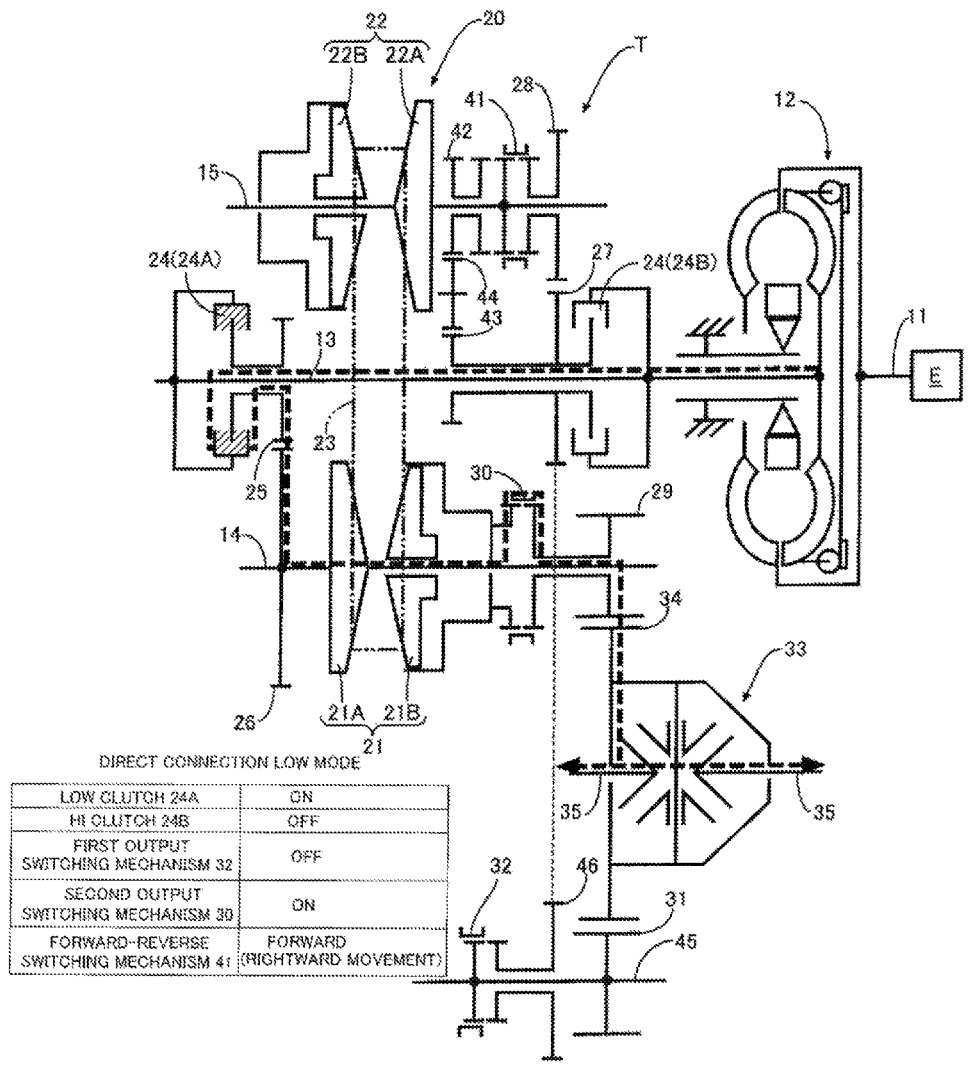
FIG. 9 is a torque flow in direct connection LOW mode.

FIG. 9 illustrates the direct connection LOW mode of the continuously variable transmission T. In the direct connection LOW mode, the LOW friction clutch 24A of the input switching mechanism 24 engages, the first output switching mechanism 32 disengages, the second output switching mechanism 30 engages, and the forward-reverse switching mechanism 41 switches to the forward side (rightward movement).

Consequently, a driving force of the engine E is transmitted via a route of the crankshaft 11→torque converter 12→main input shaft 13→LOW friction clutch 24A of the input switching mechanism 24→first reduction gear 25→second reduction gear 26→first sub-input shaft 14→second output switching mechanism 30→second final drive gear 29→final driven gear 34→differential gear 33→drive shafts 35, 35.

In the direct connection LOW mode, the belt-type continuously variable transmission mechanism 20 performs no operation, and accordingly an overall gear ratio thereof is constant.

Figure 10:
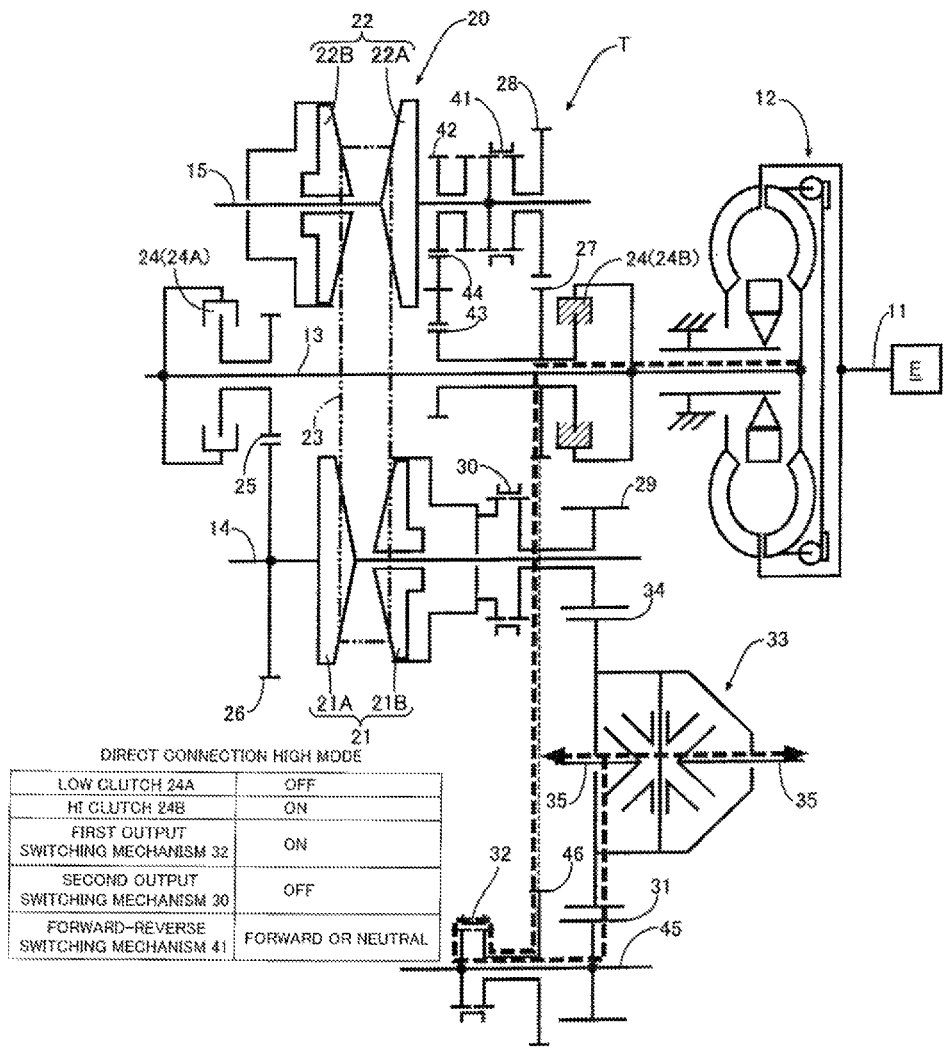
FIG. 10 is a torque flow in direct connection HI mode.

FIG. 10 illustrates the direct relation HI mode of the continuously variable transmission T. In the direct relation HI mode, the HI friction clutch 24B of the input switching mechanism 24 engages, the first output switching mechanism 32 engages, the second output switching mechanism 30 disengages, and the forward-reverse switching mechanism 41 switches to the forward side (rightward movement) or to neutral.

Consequently, a driving force of the engine E is transmitted via a route of the crankshaft 11→torque converter 12→HI friction clutch 24B of the input switching mechanism 24→first induction gear 27→third reduction gear 46→first output switching mechanism 32→third output shaft 45→first final drive gear 31→final driven gear 34→differential gear 33→drive shafts 35, 35.

In the direct connect HI mode, the belt-type continuously variable transmission mechanism 20 performs no operation, and accordingly an overall gear ratio thereof is constant.

Second Embodiment

Next, a second embodiment of the present invention will be described. In the description of the second embodiment and the corresponding figures, like reference characters refer to components corresponding or equivalent to those of the first embodiment and a detailed description thereof is dispensed with. The other features than those described as below are the same as in the first embodiment.

Figure 11:
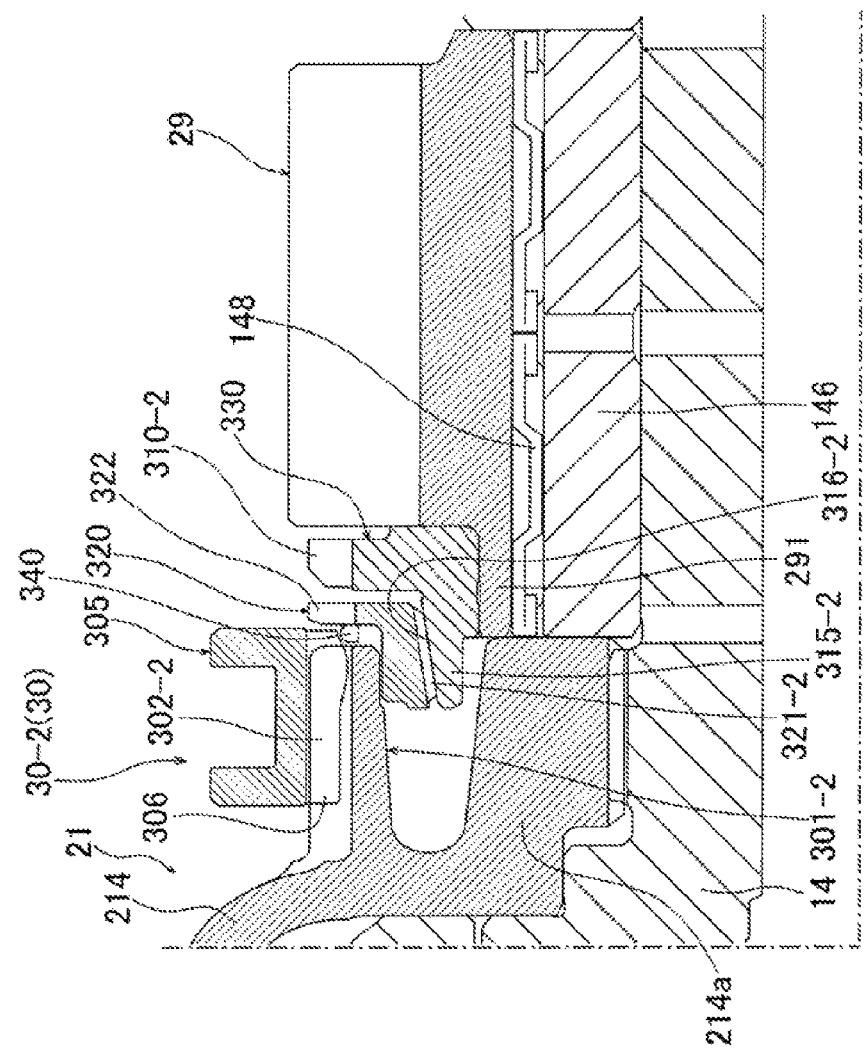
FIG. 11 is a view illustrating an output switching mechanism of a continuously variable transmission in accordance with a second embodiment of the present invention.

FIG. 11 is a view illustrating a second output switching mechanism 30-2 provided in a continuously variable transmission according to a second embodiment of the present invention. On one hand, in the second output switching mechanism 30 of the first embodiment, the synchronous hub section (holding section) 301 holding the synchronous sleeve 305 axially slidably and unrotatably is installed integrally with the second final drive gear 29. On the other hand, in the second output switching mechanism 30-2 of the present embodiment, the synchronous hub section (holding section) 301-2 holding the synchronous sleeve 305 axially slidably and unrotatably is installed integrally with the pulley piston 214. Accordingly, a dog gear 330 is press-fit to and installed integrally with the small diameter end part 291 installed at the end (on the pulley piston 214 side) of the second final drive gear 29. On an outer periphery of the dog gear 330, a dog spline (meshing section) 310-2 is formed. In addition, on an outer peripheral surface of the synchronous hub section (holding section) 301-2, a spline tooth 302-2 engaging with the spline tooth 306 of the synchronous sleeve 305 is formed.

In addition, at a tip of the dog gear 330 in the axial direction, a pipe-shaped boss section 315-2 extending to the pulley piston 214 side is formed. On an outer periphery of the boss section 315-2, a tapered cone surface 316-2 structured by a surface conically inclined in the axial direction is formed. To an outer diameter side of the tapered cone surface 316-2, a blocking ring (synchronizer ring) 320 is fit. On an inner peripheral surface of the blocking ring 80, a tapered cone surface 321-2 structured by a conically inclined surface in sliding contact with the tapered cone surface 316-2 of the boss section 315-2 is formed.

In the second output switching mechanism 30-2 of the present embodiment also, the pulley piston 214 and the first sub-input shaft 14 are disengaged with the second final drive gear 29 in a state in which the synchronous sleeve 305 is at the disengagement position on the synchronous hub section 301-2 shown in FIG. 11. And, when a sliding of the shift fork, not shown in the figure, moves the synchronous sleeve 305 along the axial direction from the disengagement position on the synchronous hub section 301-2 shown in FIG. 11 to the second final drive gear 29 side, the spline tooth 306 of the synchronous sleeve 305 engages (meshes) with both of the spline tooth 302-2 of the synchronous hub section 301-2 and the dog spline 310-2 of the dog gear 330. This allows the pulley piston 214 and the first sub-input shaft 14 to engage with the second final drive gear 29.

In the second output switching mechanism 30-2 of the present embodiment, the synchronous hub section (holding section) 301-2 holding the synchronous sleeve 305 axially slidably and unrotatably is installed integrally with the pulley piston 214. This can reduce a number of component parts of the second output switching mechanism 30-2 and the belt-type continuously variable transmission mechanism 20. Therefore, this can achieve simplification of configuration and reduction in weight and assembling process of the second output switching mechanism 30 and the belt-type continuously variable transmission mechanism 20.

Further, in the second output switching mechanism 30-2 of the present embodiment, the synchronous hub section (holding section) 301-2 holding the synchronous sleeve 305 is installed integrally with the pulley piston 214. Therefore, if in a state in which the second final drive gear 29 is disengaged with the pulley piston 214 (disengagement state), a rotational speed of the second final drive gear 29 is higher than a rotational speed of the pulley piston 214 (rotational speed of the pulley piston 214<rotational speed of the final drive gear 29), provision of the synchronous sleeve 305 on the synchronous hub section (holding section) 301-2, which is the disengagement position, can keep a rotational speed of the synchronous sleeve 305 low. This can reduce a sliding speed between the shift fork and the groove (fork groove) of the synchronous sleeve 305 and suppress abrasion generated therebetween.

In addition, according to the present invention, similar to the second output switching mechanism 30 of the first embodiment and the second output switching mechanism 30-2 of the second embodiment, the synchronous hub section (holding section) 301 (301-2) holding the synchronous sleeve 305 can be arranged both on the second final drive gear 29 side and on the pulley piston 214 side. This can improve a degree of freedom in a layout of the second output switch system 30 (30-2) as the sub-transmission mechanism.

Third Embodiment

Figure 12:
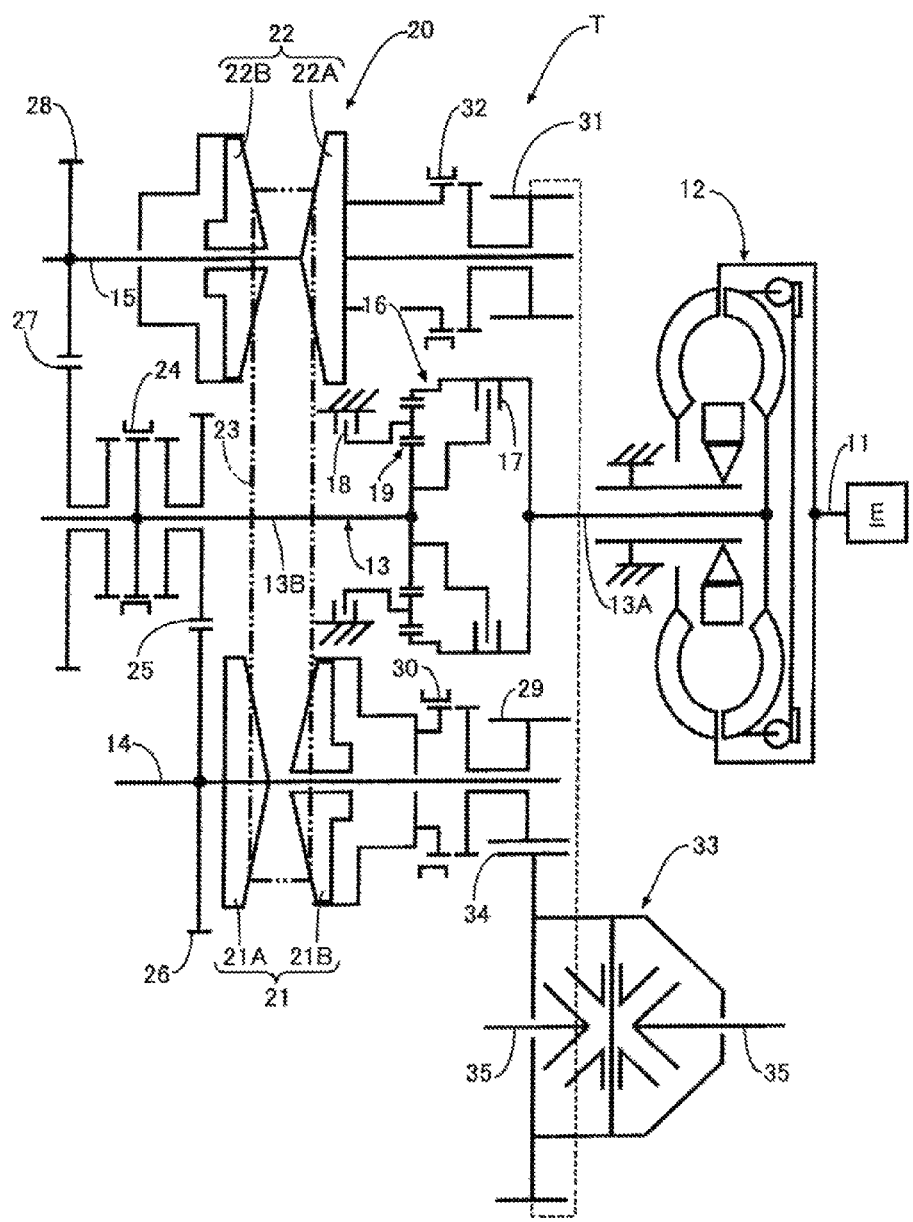
FIG. 12 is a skeleton view illustrating a whole configuration of a continuously variable transmission in accordance with a third embodiment of the present invention.

FIG. 12 is a skeleton view illustrating a whole configuration of a continuously variable transmission in accordance with a third embodiment of the present invention. On one hand, in the continuously variable transmission T of the first embodiment, the main input shaft 13 is undivided. On the other hand, in the continuously variable transmission T of the third embodiment, the main input shaft 13 is divided into two sections, namely, a first section 13A and a second section 13B. Between the first and second sections 13A, 13B, the forward-reverse switching mechanism 16 is arranged. The forward-reverse switching mechanism 16 includes a forward clutch 17, a reverse brake 18 and a planetary gear mechanism 19. A ring gear, which is a first element of the planetary gear mechanism 19, is connected to the first section 13A. A sun gear, which is a second element of the planetary gear mechanism 19, is connected to the second section 13B. A carrier, which is a third element of the planetary gear mechanism 19, is connectable to a casing via the reverse brake 18. The ring gear and the sun gear are mutually connectable via the forward clutch 17. Therefore, on one hand, when the forward clutch 17 is engaged, the first section 13A and the second section 13B of the main input shaft 13 directly connect to each other, whereby a vehicle runs forward. On the other hand, when the reverse brake 18 is engaged, the first section 13A of the main input shaft 13 rotates reversely and slows due to the planetary gear mechanism 19. Then, the rotation thereof is transmitted to the second section 13B of the main input shaft 13, whereby the vehicle runs reversely.

In addition, at the second section 13B of the main input shaft 13, the input switching mechanism 24 structured by a dog clutch is installed. In other words, while in the first embodiment, the input switching mechanism 24 is divided into the LOW friction clutch 24A and the HI friction clutch 24B, the input switching mechanism 24 is undivided in the third embodiment.

Furthermore, on one hand, in the continuously variable transmission T of the first embodiment, the forward-reverse switching mechanism 41 structured by the dog clutch is installed on the second sub-input shaft 15. On the other hand, in the continuously variable transmission T of the third embodiment, the first output switching mechanism 32 instead of the forward-reverse switching mechanism 41 is installed on the second sub-input shaft 15. In other words, on one hand, in the first embodiment, the first final drive gear 31 and the first output switching mechanism 32 are installed on the third output shaft 45. In the third embodiment, on the other hand, the first final drive gear 31 and the first output switching mechanism 32 may be installed on the second sub-input shaft 15.

Figure 13:
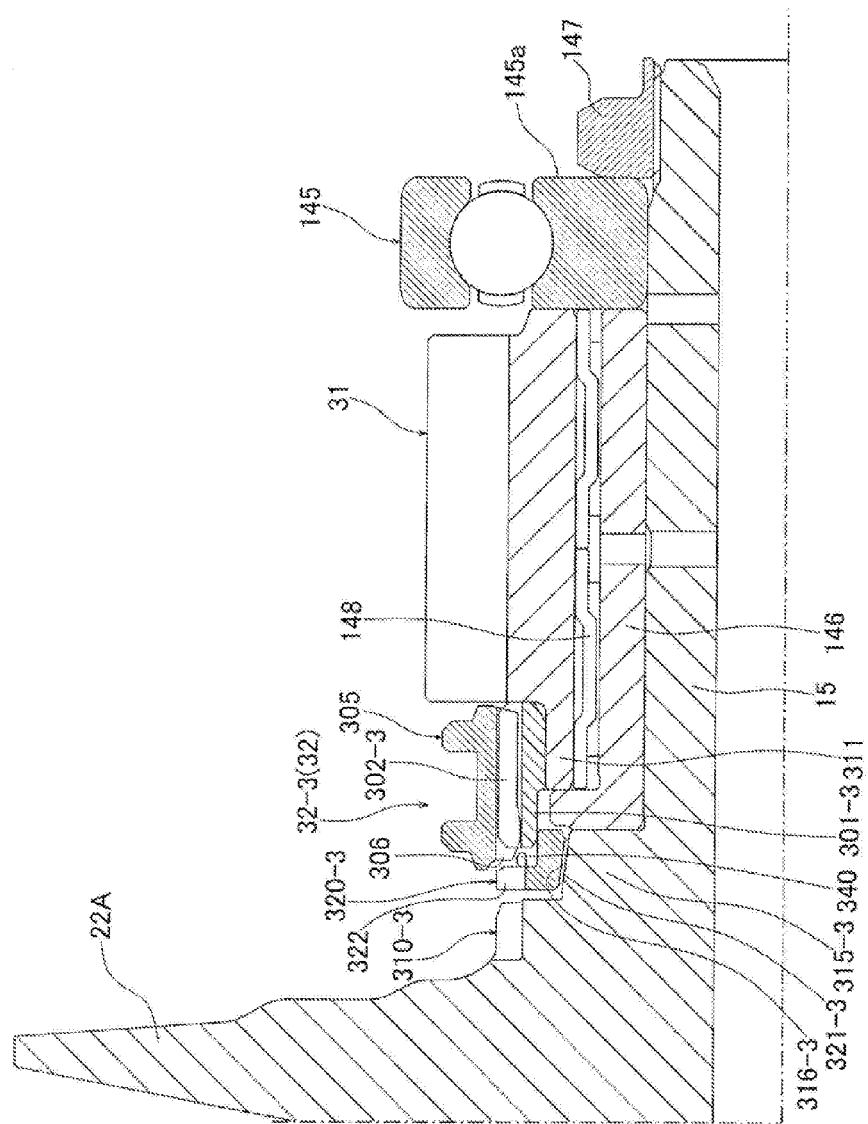
FIG. 13 is a view illustrating an output switching mechanism of a continuously variable transmission in accordance with a third embodiment of the present invention.

FIG. 13 is a view illustrating the input-output switching mechanism 32 provided in the continuously variable transmission T in accordance with the third embodiment of the present invention. The first output switching mechanism 32 (32-3) provided in the continuously variable transmission T of the present embodiment is configured similar to the second output switching mechanism 30 of the first embodiment. Due to this, a configuration different from the configuration of the second output switching mechanism 30 of the first embodiment will be mainly described as a description of the first output switching mechanism 32-3 of the present embodiment.

As shown in FIG. 13, the first output switching mechanism 32-3 of the present embodiment is installed between the fixed pulley 22A of the second pulley 22 and the first final drive gear 31 on the second sub-input shaft 15. The first output switch mechanism 32-3 switches engagement and disengagement of the fixed pulley 22A and the second sub-input shaft 15 with the first final drive gear 31.

In the first output switching mechanism 32-3 of the present embodiment, a synchronous hub section (holding section) 301-3 holding the synchronous sleeve 305 axially slidably and unrotatably is installed integrally with the first final drive gear 31 with. Accordingly, on an outer periphery of an end (on a first final drive gear 31 side) of the fixed pulley 22A, a dog spline (meshing section) 310-3 is formed. Further, on an peripheral surface of the synchronous hub section (holding section) 301-3, a spline tooth 302-3 for engaging with the spline tooth 306 of the synchronous sleeve 305 is formed.

Further, at a tip of an end of the fixed pulley 22A, a pipe-shaped boss section 315-3 extending to the first final drive gear 31 side is formed. On an outer periphery of the boss section 315-3, a tapered cone surface 316-3 structured by a surface conically inclined in the axial direction is formed. To an outer diameter side of the tapered cone surface 316-3, a blocking ring (synchronizer ring) 320-3 is fit. On an inner peripheral surface of the blocking ring 320-3, a tapered cone surface 321-3 structured by a conically inclined surface in sliding contact with the tapered cone surface 316-3 of the boss section 315-3 is formed.

In the first output switching mechanism 32-3 of the present embodiment also, the fixed pulley 22A and the second sub-input shaft 15 are disengaged with the first final drive gear 31 in a state in which the synchronous sleeve 305 is at the disengagement position on the synchronous hub section 301-3 shown in FIG. 13. When a sliding of a shift fork, not shown in the figure, moves the synchronous sleeve 305 along the axial direction from the disengagement position on the synchronous hub section 301-3 shown in FIG. 13 to a fixed pulley 22A side, the spline gear tooth 306 of the synchronous sleeve 305 engages (meshes) with both the spline gear tooth 302-3 of the synchronous hub section 301-3 and the dog spline 310-3 of the fixed pulley 22A. This allows the fixed pulley 22A and the second sub-input shaft 15 to engage with the first final drive gear 31.

In the first output switching mechanism 32-3 of the present embodiment, the synchronous hub section (holding section) 305-3 holding the synchronous sleeve 305 axially slidably and unrotatably is provided integrally with the first final drive gear 31. This can reduce a number of component parts of the first output switching mechanism 32-3 and therefore achieve simplification of configuration and reduction in weight and assembling process of the first output switching mechanism 32-3 and the belt-type continuously variable transmission mechanism 20.

Fourth Embodiment

Figure 14:
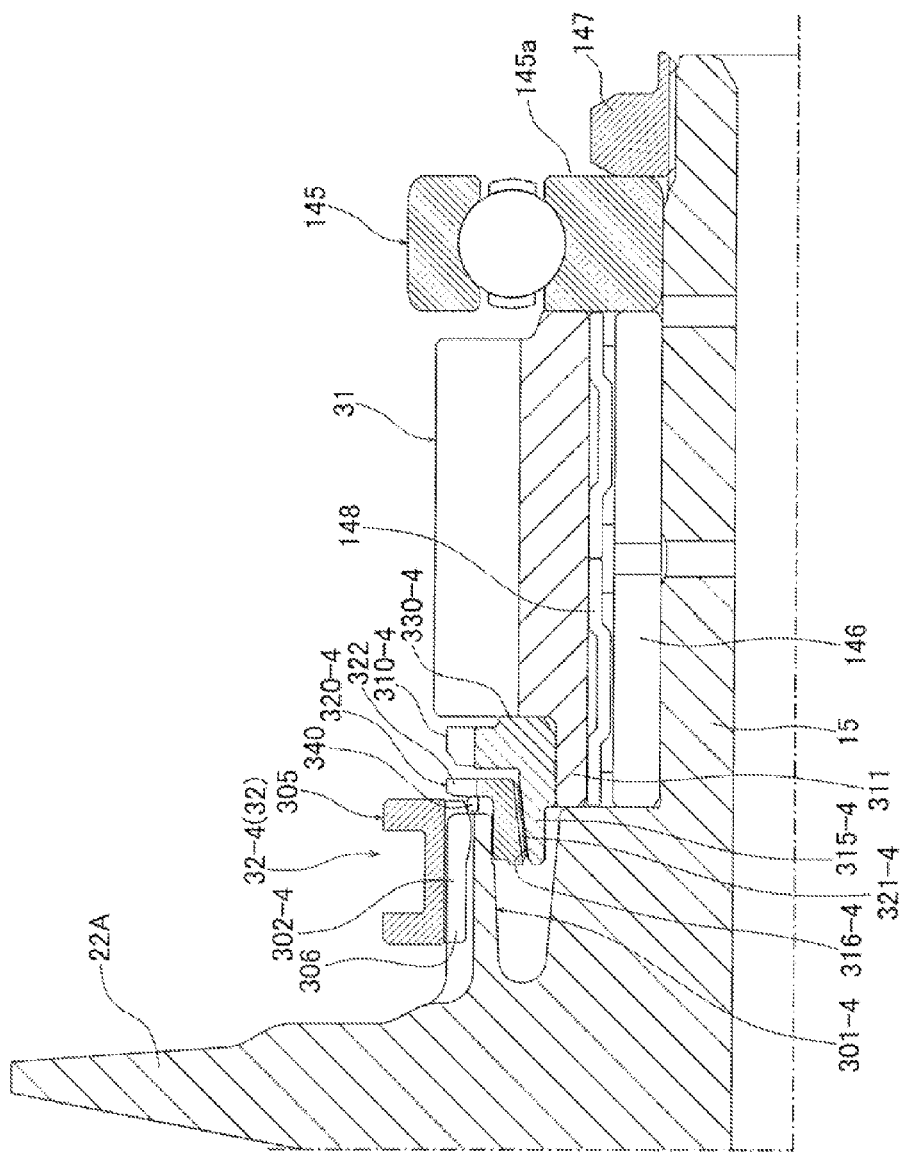
FIG. 14 is a view illustrating an output switching mechanism of a continuously variable transmission in accordance with a fourth embodiment of the present invention.

FIG. 14 is a view illustrating the first output switching mechanism 32 of a continuously variable transmission in accordance with a fourth embodiment of the present invention. On one hand, in the first output switching mechanism 32-3 of the third embodiment, the synchronous hub section (holding section) 301-3 holding the synchronous sleeve 305 axially slidably and unrotatably is installed integrally with the first final drive gear 31. On the other hand, in the first output switching mechanism 32-4 of the present embodiment, a synchronous hub section (holding section) 301-4 holding the synchronous sleeve 305 axially slidably and unrotatably is installed integrally with the fixed pulley 22A and the second sub-input shaft 15. Accordingly, a dog gear 330-4 is press-fit to and installed integrally with a small diameter end part 311 of the end (on the fixed pulley 22A side) of the first final drive gear 31. On an outer periphery of the dog gear 330-4, a dog spline (meshing section) 310-4 is formed. Further, on an outer peripheral surface of the synchronous hub section (holding section) 301-4, a spline gear tooth 302-4 that engages with a spline gear tooth 306 of the synchronous sleeve 305 is formed.

Further, at a tip of the dog gear 330-4 in the axial direction, a pipe-shaped boss section 315-4 extending to the fixed pulley 22A side is formed. On an outer periphery of the boss section 315-4, a tapered cone surface 316-4 structured by a surface conically inclined in the axial direction is formed. To an outer diameter side of the tapered cone surface 316-4, a blocking ring (synchronizer ring) 320-4 is fit. On an inner peripheral surface of the blocking ring 320-4, a tapered cone surface 321-4 structured by a conically inclined surface in sliding contact with a tapered cone surface 316-4 of the boss section 315-4 is formed.

In the first output switching mechanism 32-4 of the present embodiment also, in a state in which the synchronous sleeve 305 is at the disengagement position on the synchronous hub section 301-4 as shown in FIG. 14, the fixed pulley 22A and the second sub-input shaft 15 are disengaged with the first final drive gear 31. And, when a sliding of the shift fork, not shown in the figure, moves the synchronous sleeve 305 along the axial direction from the disengagement position on the synchronous hub section 301-4 shown in FIG. 14 to the first final drive gear 31 side, the spline tooth 306 of the synchronous sleeve 305 engages (meshes) with both of the spline tooth 302-4 of the synchronous hub section 301-4 and the dog spline 310-4 of the dog gear 330-4. This allows the fixed pulley 22A and the second sub-input shaft 15 to engage with the first final drive gear 31.

In the first output switching mechanism 32-4 of the present embodiment, the synchronous hub section (holding section) 305-4 holding the synchronous sleeve 305 axially slidably and unrotatably is provided integrally with the fixed pulley 22A, which can reduce a number of component parts of the first output switching mechanism 32-4 and the belt-type continuously variable transmission mechanism 20. Therefore, this can achieve simplification of configuration and reduction in weight and assembling process of the first output switching mechanism 32-4 and the belt-type continuously variable transmission mechanism 20.

Further, in the first output switching mechanism 32-4 of the present embodiment, the synchronous hub section (holding section) 301-4 holding the synchronous sleeve 305 is installed integrally with the fixed pulley 22A. Therefore, if in a state in which the fixed pulley 22A and the second sub-input shaft 15 are disengaged with the first final drive gear 31 (disengagement state), a rotational speed of the first drive gear 31 is higher than a rotational speed of the fixed pulley 22A (rotational speed of the fixed pulley 22A<rotational speed of the first final drive gear 31), provision of the synchronous sleeve 305 on the synchronous hub section (holding section) 301-4 can keep a rotational speed of the synchronous sleeve 305 low. This can reduce a sliding speed between the shift fork and the groove (fork groove) of the synchronous sleeve 305 and suppress abrasion generated therebetween.

In addition, according to the present invention, similar to the first output switching mechanism 32-3 of the third embodiment and the first output switching mechanism 30-4 of the fourth embodiment, the synchronous hub section (holding section) 301-3 (301-4) holding the synchronous sleeve 305 can be arranged both on the first final drive gear 31 side and on the fixed pulley 22A side. This can improve a degree of freedom in a layout of the first output switch system 32-3 (32-4) as the sub-transmission mechanism.

While the embodiment of the invention has been described, it is to be understood that the invention is not limited to the foregoing embodiment. Rather, the invention can be modified to incorporate any number of variations or alterations within the scope of claims and the scope of technical concept described in the specification and the drawings thereof. For example, on one hand, the engagement switching mechanism described in the above embodiments is the output switching mechanism including the synchronous engaging mechanism that engages the sleeve with the meshing section, while synchronizing a rotation of the gear and a rotation of the rotation shaft. On the other hand, the engagement switching mechanism in accordance with the present invention may be a mechanism (such as a dog clutch) configured so that the spline of the sleeve engages with the dog gear without any intervening synchronous engaging mechanism.

In addition, in the above-described embodiments, the engagement switching mechanism in accordance with the present invention is applied to the first output switching mechanism 32 or the second output switching mechanism 30, from among the first input switching mechanism (LOW friction clutch) 24A, the second input switching mechanism (HI friction clutch) 24B, the first output switching mechanism 32 and the second output switching mechanism 30, all of which are included in the continuously variable transmission T. Alternatively, the engagement switching mechanism in accordance with the present invention may be applied to the first input switching mechanism or the second input switching mechanism of the continuously variable transmission T.

The invention claimed is:

1. A transmission comprising:
   an input shaft to which a driving force is input from a driving source;
   a first pulley installed on one rotation shaft disposed parallel to the input shaft;
   a second pulley installed on another rotation shaft disposed parallel to the input shaft; and
   an endless member wound between the first pulley and the second pulley,
   the transmission comprising:
   a transmission mechanism for changing a rotation of a driving force from the input shaft into a predetermined gear ratio;
   a gear disposed rotatably on a rotation shaft of the first pulley or a rotation shaft of the second pulley;
   an output section from which a driving force from the transmission mechanism is output;
   a first input route for transmitting a driving force from the input shaft to the first pulley;
   a second input route for transmitting a driving force from the input shaft to the second pulley;
   a first input switching mechanism installed between the first input route and the input shaft, the first input switching mechanism for switching a driving force from the input shaft to an input to the first pulley;
   a second input switching mechanism installed between the second input route and the input shaft, the second input switching mechanism for switching a driving force from the input shaft to an input to the second pulley;
   a first output route for outputting a rotation of a driving force speed-changed in the transmission mechanism from the first pulley to the output section;
   a second output route for outputting a rotation of a driving force speed-changed in the transmission mechanism from the second pulley to the output section;
   a deceleration mechanism installed in the first input route, the deceleration mechanism for decelerating a rotation of a driving force input from the input shaft to the transmission mechanism;
   an acceleration mechanism installed in the second input route, the acceleration mechanism for accelerating a rotation of a driving force input from the input shaft to the transmission mechanism;
   a first output switching mechanism installed in the first output route, the first output switching mechanism for switching a driving force from the first output route to an output to the output section; and
   a second output switching mechanism installed in the second output route, the second output switching mechanism for switching a driving force from the second output route to an output to the output section,
   wherein the first and second switching mechanisms respectively comprise a first and second friction clutches, the first and second switching mechanisms installed on the input shaft and respectively on both sides of the endless member, wherein the first and second output switching mechanisms are respectively first and second synchronous engaging mechanisms each of which is installed between in the axial direction respectively between the first pulley and the first input switching mechanism and between the second pulley and the second input switching mechanism, wherein each of the first and second synchronous engaging mechanisms comprises:
- a sleeve that moves in the axial direction of the rotation shaft;
- a holding section for holding the sleeve axially slidably and unrotatably; and
- a meshing section installed to either one of the component part of the input section or the gear, the meshing section that meshes with the sleeve, and wherein the holding section of at least either of the first or second synchronous engaging mechanism is installed integrally with either of the first or second pulley respectively, or the gear.

\* \* \* \* \*